Jan. 30, 1923.
H. T. BATTIN.
WARNING VALVE.
FILED MAY 14, 1921.
1,443,830.
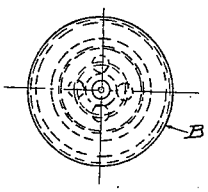
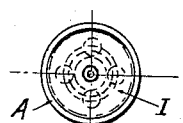
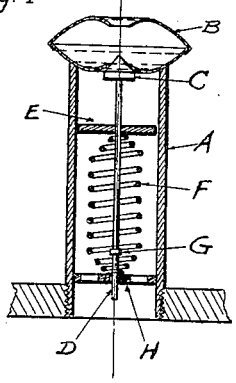
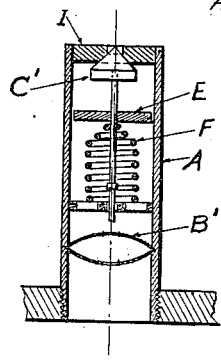
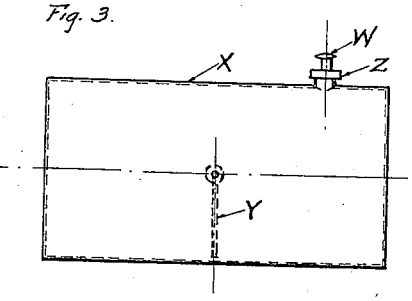
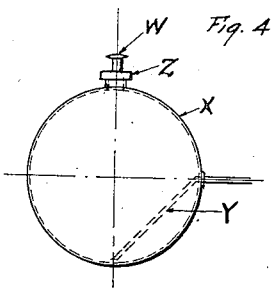
INVENTOR.
BY Harold T. Battin
Geo. A. Hoffman ATTORNEY.

Patented Jan. 30, 1923.

1,443,830

UNITED STATES PATENT OFFICE.

HAROLD T. BATTIN, OF NEW YORK, N. Y.

WARNING VALVE.

Application filed May 14, 1921. Serial No. 469,559.

*To all whom it may concern:*

Be it known that I, HAROLD T. BATTIN, a citizen of the United States, residing at New York, in the county of New York and State of New York, have invented certain new and useful Improvements in Warning Valves, of which the following is a full, clear, and exact specification.

This invention has for its object, to provide a simple and inexpensive device for gasoline systems, adapted for general use, as upon automobiles, aeroplanes, machinery, etc., which will give audible warning, automatically, whenever the gasoline supply is nearly exhausted and automatically stop the warning when the gasoline supply is replenished. It is particularly adapted for use upon what are commonly called vacuum systems, but may be used on any system where suction draws the gasoline from the supply tank.

With the above and other objects in view, I have devised the novel warning valve. of which the following description, together with the accompanying drawing, is a specification.

In this drawing:

Fig. 1 is a sectional elevation of my warning valve, showing the parts in their normal position.

Fig. 2 is a top view of the warning valve.

Fig. 3 is an elevation showing the warning valve applied to a supply tank, in a convenient manner.

Fig. 4 is an end view of Fig. 3; and

Figs. 5 and 6 are views similar to Figs. 1 and 2, but showing a modified form of my invention.

The purpose of these views, Fig. 3 and Fig. 4, is merely to show a possible application of my warning valve to a supply tank.

In the drawings, A represents the body of a valve housing, having a central passage connected at one end with the supply tank X and at the other end with a sound-producing device, such as, for instance, a whistle B. The whistle B may be of any type having an open voice hole, that will produce a whistling sound when air is sucked through it. C is a valve adapted to close and open a hole through which air is drawn to operate said whistle. This valve is shown having a conical shape, but could obviously be either tapered or ball shaped, and it is connected to a valve stem D. This valve stem carries rigidly a piston E located at a distance from the valve C; the objects of this piston are to provide a greater area for the suction to work upon than is offered by the valve, thereby improving the operation of the device, and to act as a guide to keep the valve approximately in line with its corresponding hole.

For the purpose of keeping the valve C on its seat when the device is not in operation, I have provided a spring F, one end of which bears against the piston E, while its other end bears against a perforated, stationary plate H secured to the housing A. The stem D slides in the plate H and, in order to limit the inward movement of the piston E (with the stem D and valve C), I have provided on the stem D a stop G, which, by coming in contact with the guide plate H, will limit such inward movement and thus prevent the spring F from being compressed too far and its tension destroyed. The guide plate H, together with the piston E, insures the proper seating of the valve C. It is to be understood, however, that the piston E does not fit the walls of the housing tightly, but it is sufficiently spaced therefrom to allow air to be sucked through the housing to operate the whistle.

In Figs. 3 and 4, I have indicated by the letter W the complete warning valve applied to the filling cap Z of a supply tank X, which cap may be attached to the tank in the usual manner. Y indicates the suction connection through which the gasoline or other fuel is supplied to the reserve tank, carburetor and motor, generally through suction exerted from the motor. The valve is thus exposed to the same suction which draws the fuel from the tank X through the pipe Y.

In Figs. 5 and 6, I have illustrated a modified form of my invention, in which the whistle B' is located inside the valve housing instead of on top thereof. A valve seat for the valve C' is formed in a disk I, which latter, when the valve is seated, closes the air passage in the housing. The whistle is thus protected against injury. In other respects, the device is the same as that shown in the other figures.

The operation of my warning valve is as follows:

When gasoline is drawn from the supply tank, air is drawn into the supply tank through the whistle to replace the volume of gasoline drawn out. Said air is normally of so small a quantity, in a given time, that it does not set up the necessary vibrations in the whistle to produce a whistling sound. The air just leaks in through the whistle. As the gasoline in the supply tank is consumed, its level gradually falls lower and lower until it is below the opening into the suction line, allowing a much greater volume of air to be sucked through the supply tank and whistle, in the same time, as there is no gasoline being drawn from the supply tank to interrupt the flow of air. In order to amplify the sound that this last said volume of air would produce in the whistle, the sectional area of the air passage below the whistle is made larger than the sectional area of the hole in the whistle. To further amplify this sound, a valve has been provided to close the opening in the whistle or the opening into the valve housing, said valve being held closed by the spring until the suction acting on the valve and piston becomes strong enough to overcome the tension of the spring and open the valve, when air of the proper volume and pressure will be drawn through the whistle to produce a sound of the desired loudness or tone. The inrush of this air through the whistle will decrease the suction acting upon the whistle valve and piston and the spring will again close the valve, stopping the whistle, until said suction is increased sufficiently to again open the valve. An intermittent whistling sound is thus produced, giving warning that the supply of fuel in the tank is nearly exhausted.

While the force which operates the whistle is referred to as suction, it is also known as that force due to a pressure of atmosphere on the outside of valve and less than atmosphere on the inside, called vacuum.

I claim:

In combination with a suction tank for gasoline or the like, a housing having an air passage in communication with the interior of the tank, a sound-producing device on said housing, means for allowing air to pass said sound-producing device without operating it while the suction in said tank is normal, but for operating said device when the suction in said tank becomes abnormal.

In testimony whereof, I affix my signature.

HAROLD T. BATTIN.